United States Patent
Nishioka et al.

(10) Patent No.: US 8,763,246 B2
(45) Date of Patent: Jul. 1, 2014

(54) METHOD FOR CONNECTING OPTICAL FIBERS

(75) Inventors: Daizo Nishioka, Kanagawa (JP); Yukihiro Yokomachi, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 190 days.

(21) Appl. No.: 13/497,215

(22) PCT Filed: Sep. 17, 2010

(86) PCT No.: PCT/JP2010/066212
§ 371 (c)(1),
(2), (4) Date: Mar. 20, 2012

(87) PCT Pub. No.: WO2011/040276
PCT Pub. Date: Apr. 7, 2011

(65) Prior Publication Data
US 2012/0174395 A1   Jul. 12, 2012

(30) Foreign Application Priority Data
Oct. 2, 2009   (JP) ................................. 2009-230789

(51) Int. Cl.
*H01R 43/00*   (2006.01)
(52) U.S. Cl.
USPC ................... 29/869; 29/868; 29/870; 29/871
(58) Field of Classification Search
USPC ........................................... 29/868, 869, 872
See application file for complete search history.

(56) References Cited

U.S. PATENT DOCUMENTS

| | | | | |
|---|---|---|---|---|
| 5,042,902 A | * | 8/1991 | Huebscher et al. | 385/72 |
| 5,150,516 A | * | 9/1992 | Boero et al. | 29/877 |
| 5,189,717 A | * | 2/1993 | Larson et al. | 385/95 |
| 5,692,299 A | * | 12/1997 | Daems et al. | 29/869 |
| 6,193,421 B1 | * | 2/2001 | Tamekuni et al. | 385/65 |
| 7,140,787 B2 | * | 11/2006 | Yamauchi et al. | 385/98 |
| 2008/0304795 A1 | | 12/2008 | Oike et al. | |

FOREIGN PATENT DOCUMENTS

| | | |
|---|---|---|
| CN | 101006374 A | 7/2007 |
| CN | 201207090 Y | 3/2009 |
| JP | H11-295556 A | 10/1999 |
| JP | 2000-121863 A | 4/2000 |
| JP | 2005-308982 A | 11/2005 |
| JP | 2007-121886 A | 5/2007 |

OTHER PUBLICATIONS

English translation of PCT/ISA/237 issued in PCT/JP2010/066212.
Chinese Office Action of the corresponding Chinese Patent Application No. 201080042096.8, dated Jan. 8, 2014.

* cited by examiner

*Primary Examiner* — Carl Arbes
(74) *Attorney, Agent, or Firm* — Global IP Counselors, LLP

(57) ABSTRACT

Provided is an optical fiber connection method for using an optical fiber connector which includes a mechanical splice designed to connect a first optical fiber having a coating diameter D to mechanically connect two optical fibers that include a second optical fiber having a coating diameter d smaller than the coating diameter D. This method includes a first step of inserting the second optical fiber into a tube (30) to obtain a tubed optical fiber (31); a second step of fixing the tubed optical fiber (31) in a fiber holder (15); a third step of inserting the tubed optical fiber (31) into the mechanical splice (2) and placing distal ends of the two optical fibers including the tubed optical fiber (31) end to end; and a fourth step of fixing the tubed optical fiber (31) in the mechanical splice (2) in a state in which the distal ends of the two optical fibers are placed end to end.

6 Claims, 9 Drawing Sheets

METHOD FOR CONNECTING OPTICAL FIBERS

TECHNOLOGICAL FIELD

The present invention relates to an optical fiber connection method for mechanically connecting two optical fibers.

BACKGROUND TECHNOLOGY

Japanese Laid-open Patent Publication No. 2000-121863 discloses a mechanical splice for placing distal end faces of two bare fibers end to end and connecting the bare fibers, and a coated optical fiber connection that uses the mechanical splice. A plurality of types of optical fibers having different coating diameters (fiber diameters) have recently been used. Consequently, in the technique disclosed in Japanese Laid-open Patent Publication No. 2000-121863, a mechanical splice for each diameter of optical fiber must be individually prepared as the optical fiber connector.

SUMMARY

Problems to Be Solved by the Invention

An object of the present invention is to provide a simple method for mechanically connecting optical fibers through use of the same optical fiber connector irrespective of the diameter of the optical fibers.

Means Used to Solve the Above-Mentioned Problems

In order to achieve the abovementioned objects, there is provided an optical fiber connection method for using an optical fiber connector which includes a mechanical splice designed to connect a first optical fiber having a coating diameter D to mechanically connect two optical fibers that include a second optical fiber having a coating diameter d smaller than the coating diameter D. This method includes a first step of inserting the second optical fiber into a tube to obtain a tubed optical fiber, a second step of fixing the tubed optical fiber in a fiber holder, a third step of inserting the tubed optical fiber fixed in the fiber holder into the mechanical splice and placing distal ends of the two optical fibers including the tubed optical fiber end to end, and a fourth step of fixing the tubed optical fiber in the mechanical splice in a state in which the distal ends of the two optical fibers including the tubed optical fiber are placed end to end.

The mechanical splice can include a base having a fiber groove for positioning the optical fiber, a pressing member for pressing the optical fiber against the base, the optical fiber being disposed in the fiber groove; and a clamp for holding together the base and the pressing member. In a first embodiment of the present invention, a ferrule for retaining an embedded optical fiber is fixed in the base, and in the third step, the tubed optical fiber fixed in the fiber holder is inserted into the mechanical splice, and the distal ends of the tubed optical fiber and the embedded optical fiber are placed end to end. In a second embodiment of the present invention, in the second step, two fiber holders are prepared, and two tubed optical fibers are fixed one each in the two fiber holders. In the third step, the two tubed optical fibers fixed in the two fiber holders are inserted into the mechanical splice from both sides of the mechanical splice, and the distal ends of the tubed optical fibers are placed end to end.

The tube is preferably one in which at least one end portion thereof is shaped so that the diameter thereof increases toward the one end. The tube is also preferably one in which at least one end face thereof is inclined with respect to a face perpendicular to the axis of the tube.

BRIEF DESCRIPTION OF THE PREFERRED EMBODIMENTS

Figure 1:
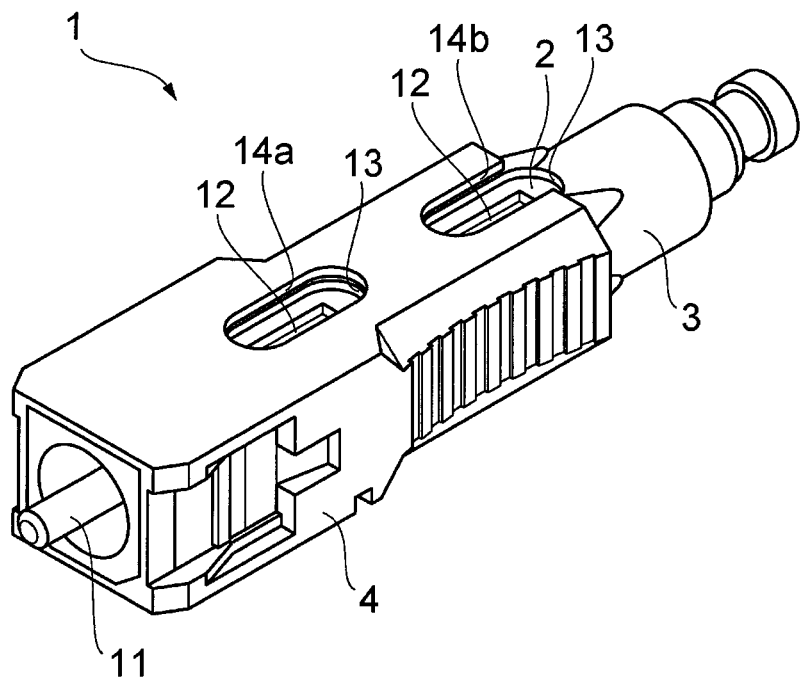
FIG. 1 is a perspective view showing the optical fiber connector used in the first embodiment of the present invention.

An embodiment of the optical fiber connection method according to the present invention will be described in detail with reference to the drawings. In the drawings, the same or equivalent members are referenced using the same symbols, and no redundant descriptions thereof are given.

FIG. 1 is a perspective view showing an optical fiber connector 1 used in a first embodiment of the optical fiber connection method of the present invention. The optical fiber connector 1 is a mechanical splice-type connector into which is built an optical fiber that has a coating diameter (fiber diameter) D (0.9 mm in this case). The optical fiber connector 1 is provided with a mechanical splice 2 for mechanically connecting optical fibers, a housing 3 for accommodating the mechanical splice 2, and a grip 4 for covering the housing 3 from a front end to a center portion thereof. A spring (not shown) for urging the mechanical splice 2 forward is disposed inside the housing 3.

Figure 2:
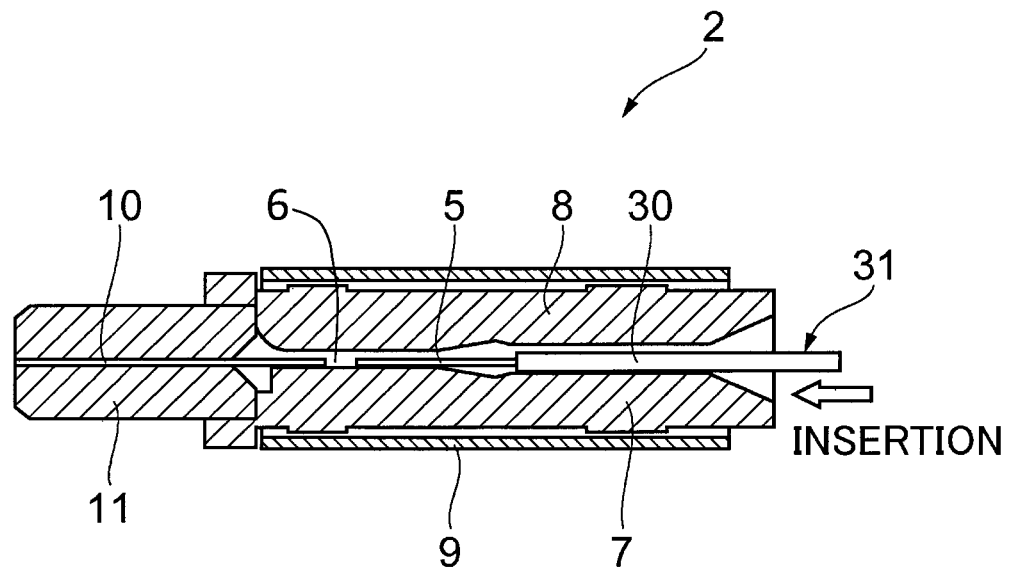
FIG. 2 is a sectional view showing the optical fiber of the mechanical splice included in the optical fiber connector of FIG. 1.
Figure 3A:
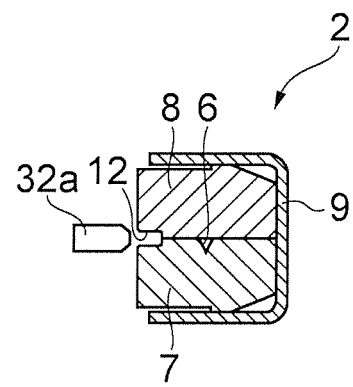
FIGS. 3A, 3B, and 3C are sectional views perpendicular to the optical fiber of the mechanical splice included in the optical fiber connector of FIG. 1, and show the shims prior to insertion, during insertion, and after withdrawal, respectively.
Figure 3B:
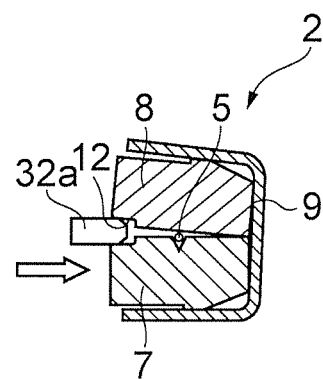
Figure 3C:
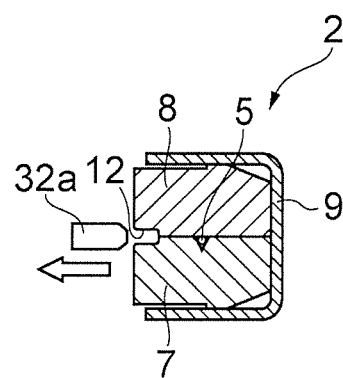

FIG. 2 is a sectional view including the optical fiber of the mechanical splice 2. FIGS. 3A, 3B, and 3C are sectional views perpendicular to the optical fiber of the mechanical splice 2, and show a state prior to insertion of a shim, during insertion of a shim, and after withdrawal of shim, respectively. The mechanical splice 2 has a base plate (base) 7 having a V-shaped fiber groove 6 for positioning an optical fiber 5, a pressing plate (pressing member) 8 for pressing the optical fiber 5 disposed in the fiber groove 6 against the base 7, and a U-shaped clamping spring (clamp) 9 for holding together the base 7 and the pressing member 8.

A ferrule 11 in which a short-length embedded optical fiber 10 is retained is integrally fixed to a front end part of the base 7. A front end face of the ferrule 11 is polished. The embedded optical fiber 10 extends from the front end face of the ferrule 11 into the fiber groove 6 of the mechanical splice 2.

A plurality of (two in this case) shim insertion cavities 12 into which shims 32a of a shim member 32 (FIGS. 5 and 6) is inserted is formed at the boundary between the base 7 and the pressing member 8 in the mechanical splice 2. The base 7 and the pressing member 8 are held together by the clamp 9 from the side opposite the shim insertion cavities 12.

A plurality of (two in this case) elongated through holes 13 through which the shims 32a are passed to be inserted in the shim insertion cavities 12 is formed in the housing 3 (FIG. 1). An elongated through hole 14a and a notch 14b are formed in positions corresponding to the elongated through holes 13 in the grip 4.

In the optical fiber connector 1, when the optical fiber 5 is to be connected to the embedded optical fiber 10, the shims 32a are first inserted into the shim insertion cavities 12 of the mechanical splice 2 via the elongated through hole 14a and notch 14b of the grip 4, and the elongated through holes 13 of the housing 3 (FIG. 3B). The base 7 and pressing member 8 of the mechanical splice 2 are thus placed in an open state.

The optical fiber 5 is then inserted into the mechanical splice 2 from the opposite side (rear part) of the mechanical splice 2 from the ferrule 11, and the distal end face of the optical fiber 5 is placed against the distal end face of the embedded optical fiber 10 (FIG. 2). In this state, the shims 32a are withdrawn from the shim insertion cavities 12 of the mechanical splice 2 (FIG. 3C). The base 7 and the pressing member 8 are then closed by the clamp 9, and the optical fiber 5 and the embedded optical fiber 10 are fixed together in the mechanical splice 2 in a state of connection to each other.

The method for connecting an optical fiber having a coating diameter (fiber diameter) d (0.25 mm in this case) smaller than the diameter D to the embedded optical fiber 10 that is provided to the mechanical splice-type connector (optical fiber connector) 1 will next be described as a first embodiment of the optical fiber connection method of the present invention. In the present specification, the optical fiber having the fiber diameter d is referred to as the small-diameter optical fiber, and the optical fiber having the fiber diameter D larger than the fiber diameter d is referred to as the large-diameter optical fiber.

Figure 4:
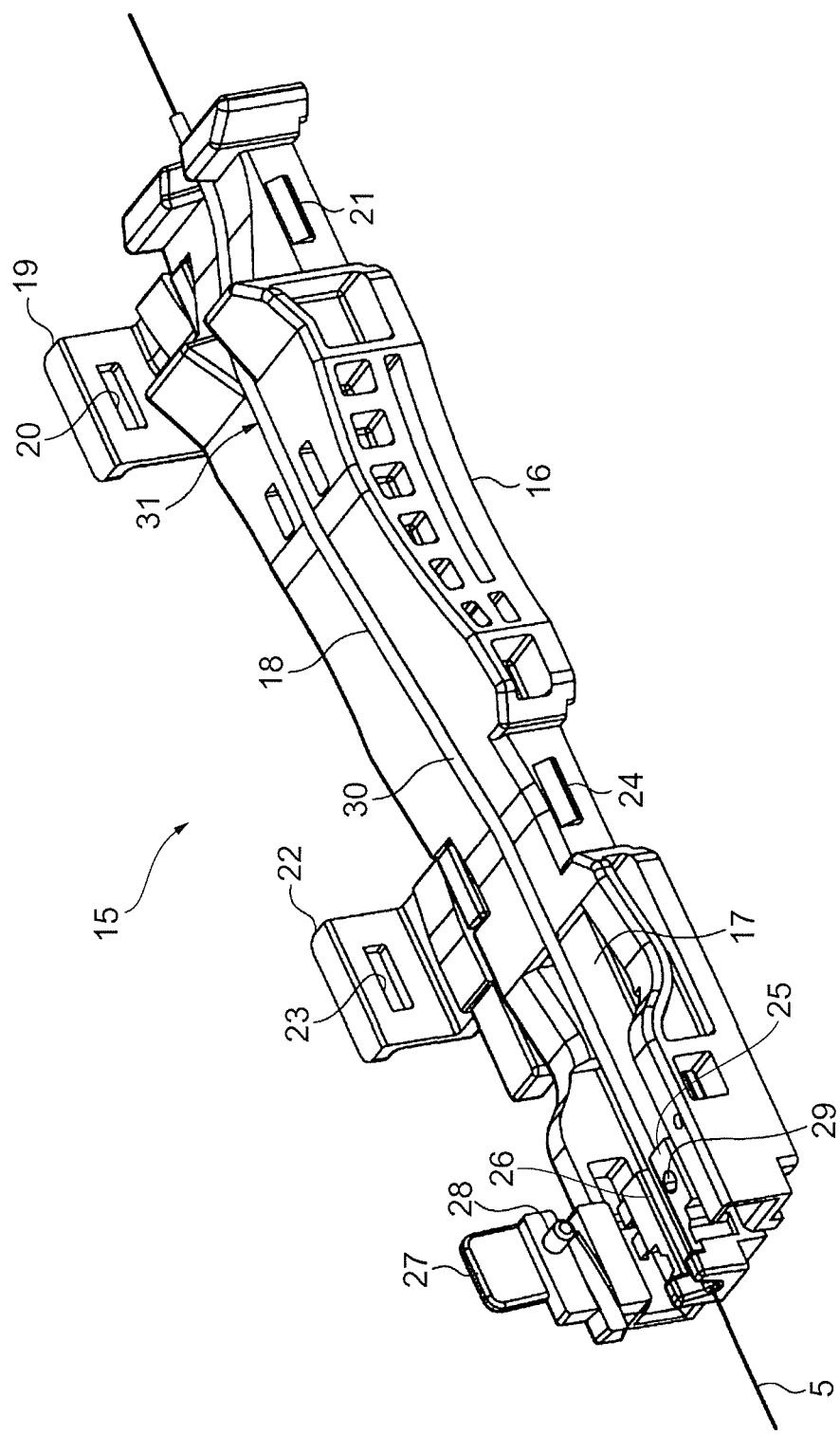
FIG. 4 is a view showing the first embodiment of the optical fiber connection method of the present invention, and is a perspective view showing a state in which a small-diameter optical fiber is disposed on a fiber holder for a large-diameter optical fiber.

FIG. 4 is a view showing a first embodiment of the optical fiber connection method of the present invention, and is a perspective view showing a state in which a small-diameter optical fiber is disposed on a fiber holder 15 for a large-diameter optical fiber. The fiber holder 15 has a holder base 16 and a holder guide 17 that is provided so as to be able to move forward and backward with respect to the holder base 16. The holder base 16 has a top surface part that is curved so as to be convex upward. A fiber groove 18 for positioning the optical fiber is formed in the top surface part.

A substantially U-shaped rear fiber fixing cover 19 for fixing the optical fiber in the fiber groove 18 is attached to a rear part of the holder base 16. The fiber fixing cover 19 can be opened and closed via a shaft (not shown) provided to the holder base 16. Rubber is preferably affixed to a back surface of the rear fiber fixing cover 19. An engagement receiving hole 20 is formed in a distal end part of the rear fiber fixing cover 19. The engagement receiving hole 20 is engaged with an engaging projection 21 provided to a lateral surface of the holder base 16, whereby the optical fiber disposed in the fiber groove 18 is restrained against the rear part of the holder base 16.

A substantially U-shaped middle fiber fixing cover 22 for fixing the optical fiber in the fiber groove 18 is attached in front of the rear fiber fixing cover 19 in the holder base 16. The middle fiber fixing cover 22 is able to open and close via a shaft (not shown) provided to the holder base 16. An engagement receiving hole 23 is formed in a distal end part of the middle fiber fixing cover 22. The engagement receiving hole 23 is engaged with an engaging projection 24 provided to a lateral surface of the holder base 16, whereby the optical fiber disposed in the fiber groove 18 is restrained against the middle part of the holder base 16.

A fiber support part 25 is provided at a front end of the holder guide 17. A fiber groove 26 for positioning the optical fiber is formed in a top surface part of the fiber support part 25. A front fiber pressing cover 27 for pressing the optical fiber in the fiber groove 26 is integrally fixed to the fiber support part 25 so as to be able to open and close via a hinge. An engaging projection 28 is provided to a back surface of the front fiber pressing cover 27. By engaging the engaging projection 28 with an engagement receiving hole 29 formed in the top surface part of the fiber support part 25, the optical fiber in the fiber groove 26 can be kept from rising upward.

When the small-diameter optical fiber 5 (fiber diameter: 0.25 mm) is to be connected to the embedded optical fiber 10 provided to the optical fiber connector 1, the small-diameter optical fiber 5 is first inserted into a tube 30 (whose inside diameter is 0.3 to 0.5 mm, somewhat larger than the fiber diameter of the small-diameter optical fiber) having substantially the same outside diameter as the fiber diameter D (0.9 mm) of the large-diameter optical fiber, and a tubed optical fiber 31 is obtained. The tube 30 is formed of resin or the like, and the outside diameter thereof is preferably D±0.1 mm.

The tubed optical fiber 31 is then retained in the fiber holder 15. Specifically, in a state in which the rear fiber fixing cover 19, the middle fiber fixing cover 22, and the front fiber pressing cover 27 are open, the tubed optical fiber 31 is placed in the fiber groove 18 of the holder base 16 and the fiber groove 26 of the holder guide 17. The covers are then closed. The tubed optical fiber 31 is thereby fixed in the holder base 16 by the rear fiber fixing cover 19 and the middle fiber fixing cover 22, and the distal end portion of the tubed optical fiber 31 is pressed by the front fiber pressing cover 27. At this time, the small-diameter optical fiber 5 and the tube 30 of the tubed optical fiber 31 are compressed together by the rear fiber fixing cover 19 and the middle fiber fixing cover 22. Affixing rubber to the back surface of the rear fiber fixing cover 19 enables the tubed optical fiber 31 to be more securely fixed to the holder base 16.

Figure 5:
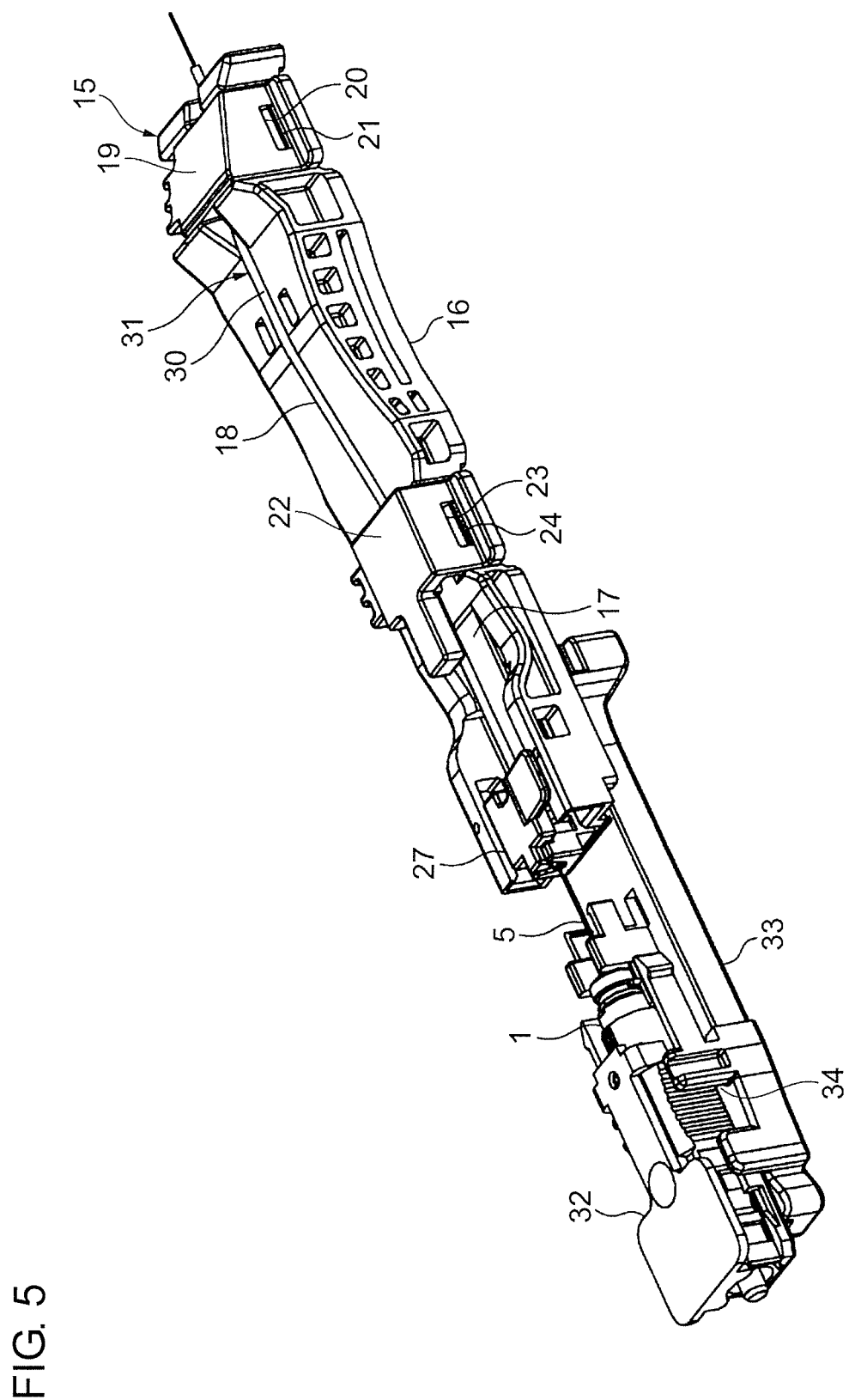
FIG. 5 is a view showing the first embodiment of the optical fiber connection method of the present invention, and is a perspective view showing a state in which the small-diameter optical fiber is inserted into an optical fiber connector for the large-diameter optical fiber.
Figure 6:
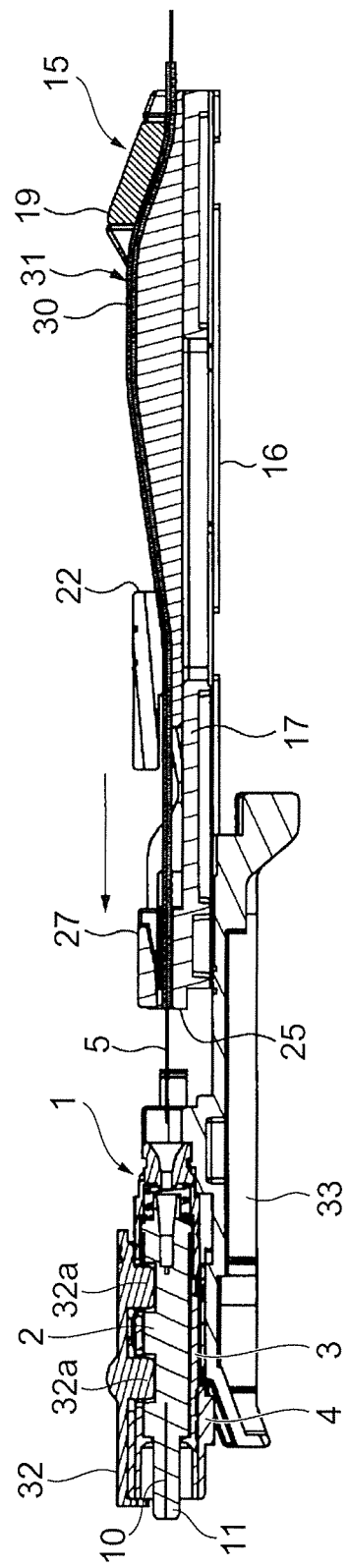
FIG. 6 is a sectional view corresponding to FIG. 5.

FIG. 5 is a perspective view showing a state in which the small-diameter optical fiber is inserted into the optical fiber connector 1 for the large-diameter optical fiber. FIG. 6 is a sectional view corresponding to FIG. 5. The shim member 32 and an assembly assistance jig 33 are also prepared. The shims 32a are inserted into the shim insertion cavities 12 of the mechanical splice 2, thereby creating a state in which the base 7 and pressing member 8 of the mechanical splice 2 are opened. In this state, the optical fiber connector 1 is placed in a connector accommodating part 34 of the assembly assistance jig 33 so that the shim member 32 is positioned at the top.

The fiber holder 15 in which the tubed optical fiber 31 is retained is then disposed on the opposite side of the optical fiber connector 1 on the assembly assistance jig 33. The fiber holder 15 is then moved toward the optical fiber connector 1 on the assembly assistance jig 33. After the tubed optical fiber 31 retained in the fiber holder 15 has been inserted into the optical fiber connector 1, the middle fiber fixing cover 22 is opened. In this state, the fiber holder 15 is further moved toward the optical fiber connector 1. The tubed optical fiber 31 inserted in the mechanical splice 2 then impinges on the embedded optical fiber 10.

Figure 7:
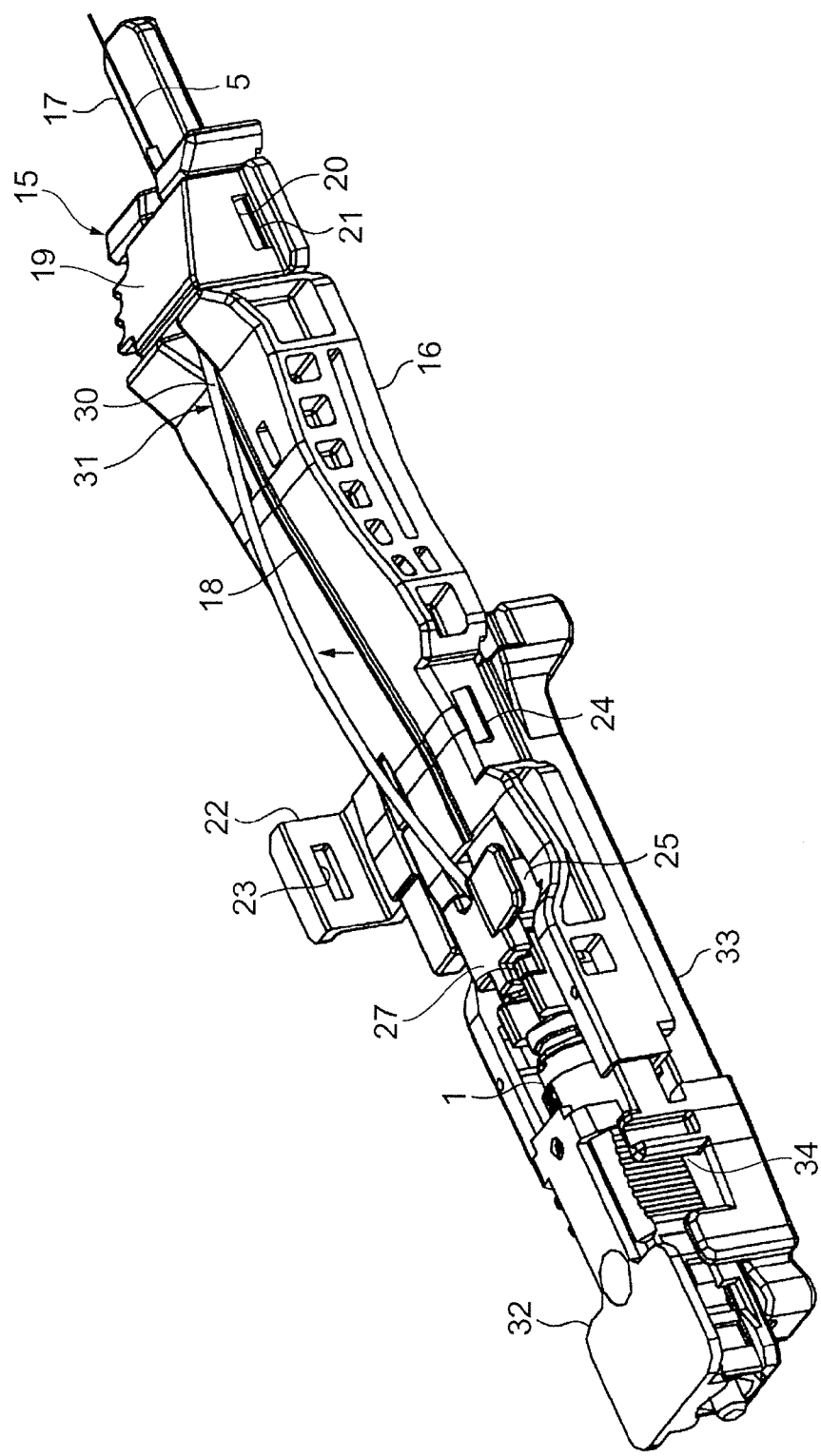
FIG. 7 is a view showing the first embodiment of the optical fiber connection method of the present invention, and is a perspective view showing a state after the small-diameter optical fiber is inserted into the optical fiber connector for the large-diameter optical fiber.
Figure 8:
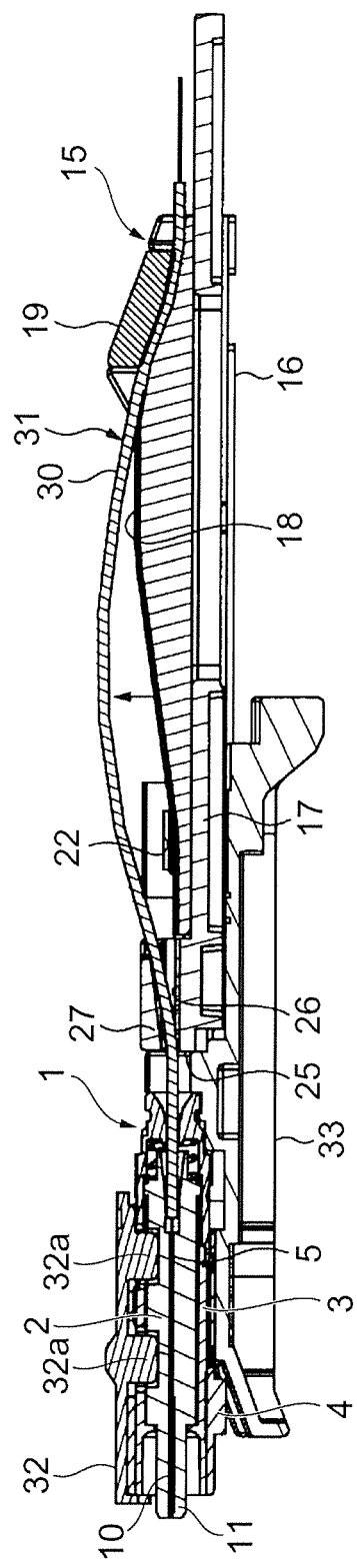
FIG. 8 is a sectional view corresponding to FIG. 7.

FIG. 7 is a perspective view showing the state subsequent to insertion of the small-diameter optical fiber into the optical fiber connector 1 for the large-diameter optical fiber. FIG. 8 is a sectional view corresponding to FIG. 7. When the distal end of the tubed optical fiber 31 impinges on the distal end of the embedded optical fiber 10, the tubed optical fiber 31 flexes upward in relation to the fiber holder 15 between the front fiber pressing cover 27 and the rear fiber fixing cover 19 of the fiber holder 15, and the impinging state is maintained by the restoring force of the tubed optical fiber 31.

Figure 9:
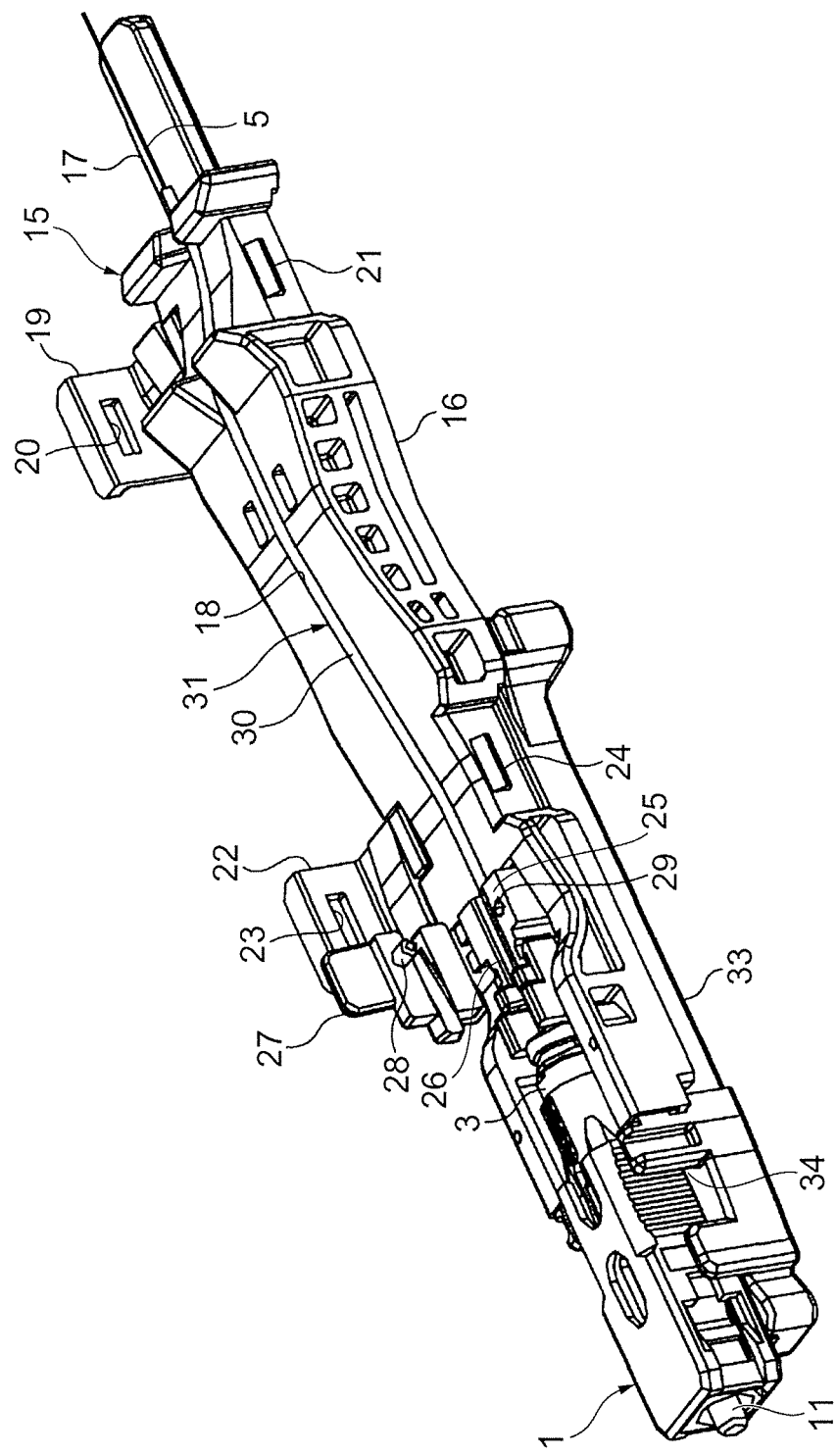
FIG. 9 is a view showing the first embodiment of the optical fiber connection method of the present invention, and is a perspective view showing a state after the shims are withdrawn from the optical fiber connector.

FIG. 9 is a perspective view showing the state subsequent to withdrawing the shims from the optical fiber connector. The base 7 and pressing member 8 of the mechanical splice 2 are closed by withdrawing the shims 32a from the shim insertion cavities 12 of the mechanical splice 2. The embedded optical fiber 10 and the tubed optical fiber 31 are thereby fixed in the mechanical splice 2 in a state of connection. The small-diameter optical fiber can thereby be easily connected to the embedded optical fiber retained in the ferrule, through use of an optical fiber connector having a mechanical splice for a large-diameter optical fiber. The front fiber pressing cover 27 and the rear fiber fixing cover 19 of the fiber holder 15 are then opened, and the optical fiber connector 1 in which the tubed optical fiber 31 is assembled is removed from the assembly assistance jig 33.

Figure 10A:
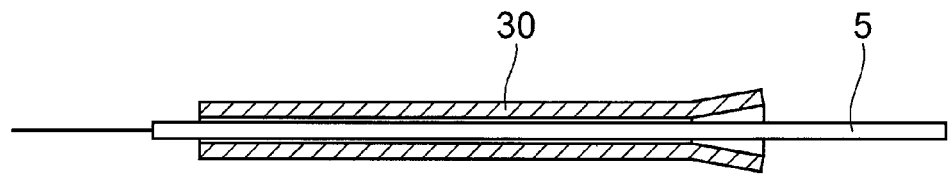
FIGS. 10A and 10B are sectional views showing an example of the tube used in the optical fiber connection method of the present invention.
Figure 10B:
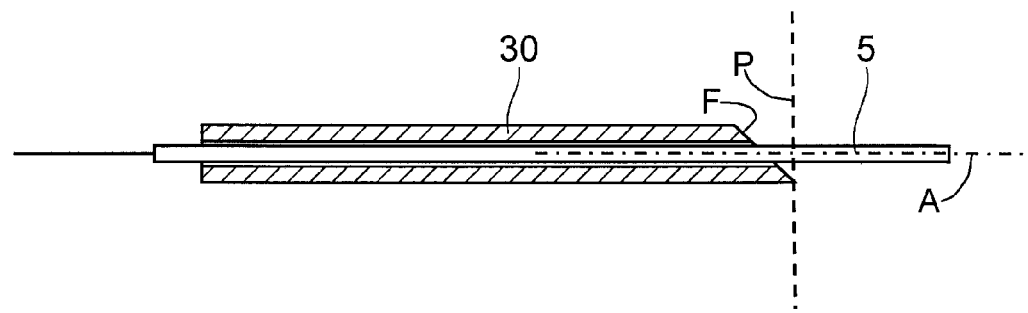

FIGS. 10A and 10B are sectional views showing an example of the tube used in the optical fiber connection method of the present invention. In order to facilitate insertion of the small-diameter optical fiber 5 into the tube 30, one end portion of the tube 30 is preferably formed having a flared shape in which the diameter gradually increases toward the one end, as in the example shown in FIG. 10A. One end face F of the tube 30 can also be cut so as to be angled with respect to a plane P that is perpendicular to a central axis A of the tube 30, as in the example shown in FIG. 10B. In both of these cases, the open area of at least one end face of the tube 30 is increased, and the small-diameter optical fiber 5 can therefore be easily inserted into the tube 30 from the opening of that end.

The optical fiber connector 1 having the mechanical splice 2 for a large-diameter optical fiber can thereby be used for a small-diameter optical fiber as well as for a large-diameter optical fiber. There is no need to individually prepare an optical fiber connector that has a mechanical splice for a small-diameter optical fiber. Since there is also no need to design and fabricate the internal structure of the mechanical splice to have a complex shape in order to adapt to small-diameter optical fibers as well as large-diameter optical fibers, a significant advantage is gained in terms of cost.

Since the tube 30 and small-diameter optical fiber 5 of the tubed optical fiber 31 are integrally fixed by the rear fiber fixing cover 19 of the fiber holder 15, and the tubed optical fiber 31 is inserted into the mechanical splice 2 in this state, the small-diameter optical fiber 5 does not move out of alignment with respect to the tube 30 when the tubed optical fiber 31 and the embedded optical fiber 10 are placed end to end. The tubed optical fiber 31 and the embedded optical fiber 10 therefore impinge on each other with adequate force, and the small-diameter optical fiber 5 and the embedded optical fiber 10 can therefore be reliably connected.

Figure 11:
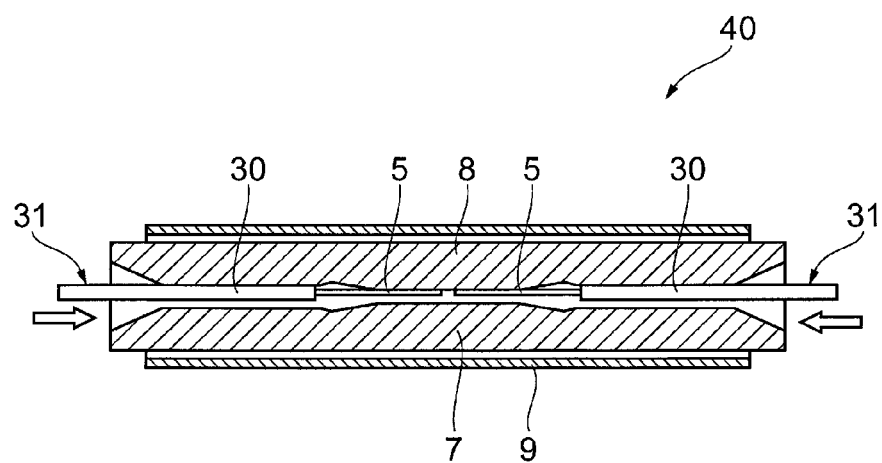
FIG. 11 is a sectional view showing the mechanical splice of the optical fiber connector that is used in a second embodiment of the optical fiber connection method of the present invention.

FIG. 11 is a sectional view showing a mechanical splice 40 of the optical fiber connector used in a second embodiment of the optical fiber connection method of the present invention. The mechanical splice 40 is composed of a base 7 having a fiber groove 6, and a pressing member 8 and clamp 9, the same as the mechanical splice 2 (FIGS. 2 and 3). A plurality of shim insertion cavities 12 are provided at the boundary between the base 7 and the pressing member 8. The dimensions of the fiber groove 6 of the mechanical splice 40 are set so as to connect two impinging large-diameter optical fibers having the coating diameter D. The mechanical splice 40 is covered by a housing not shown in the drawing.

When two small-diameter optical fibers 5 having a coating diameter d smaller than the coating diameter D are to be connected using an optical fiber connector that has the mechanical splice 40, the two small-diameter optical fibers 5 are first inserted into tubes 30 having outside diameter D to obtain tubed optical fibers 31. Two fiber holders 15 are then prepared, and a tubed optical fiber 31 is retained/fixed in each fiber holder 15.

The two tubed optical fibers 31 are then inserted into the mechanical splice 40 from both sides of the mechanical splice 40 in a state in which the base 7 and pressing member 8 of the mechanical splice 40 are opened by the shim member 32, so that the distal ends of the tubed optical fibers 31 impinge on each other. In this state, the shim member 32 is removed from the mechanical splice 40, and the base 7 and pressing member 8 of the mechanical splice 40 are closed. The tubed optical fibers 31 are thereby fixed in the mechanical splice 40 in a state of connection with each other, and using the optical fiber connector having a mechanical splice for a large-diameter optical fiber, the two small-diameter optical fibers can easily be connected to each other.

Two small-diameter optical fibers 5 are connected in the second embodiment, but an embodiment is also possible in which a small-diameter optical fiber 5 having the coating diameter d and a large-diameter optical fiber having the coating diameter D are mechanically spliced. In this embodiment, only the small-diameter optical fiber 5 is inserted into the tube 30 to obtain a tubed optical fiber 31 of outside diameter D, which is then fixed in the mechanical splice, and the large-diameter optical fiber is fixed in the mechanical splice without modification.

As described above, when an optical fiber connector having a mechanical splice for a large-diameter optical fiber is used to mechanically connect optical fibers that include a small-diameter optical fiber in the optical fiber connection method of the present invention, the small-diameter optical fiber is first inserted into a tube to obtain a tubed optical fiber. The tubed optical fiber is then inserted into the mechanical splice, the distal ends of two optical fibers that include the tubed optical fiber are placed end to end, and the tubed optical fiber is fixed in the mechanical splice in this state. By creating a tubed optical fiber in this manner, optical fibers that include a small-diameter optical fiber can easily be mechanically connected even when an optical fiber connector is used that has a mechanical splice for a large-diameter optical fiber.

The present invention is not limited to the embodiments described above. For example, the diameters of the optical fibers used are not limited to the values described in the embodiments. The dimensions and structure of the mechanical splice are also not limited to those of the embodiments described above.

INDUSTRIAL APPLICABILITY

The optical fiber connection method of the present invention can be used to connect fibers to subscribers in the optical interconnections of a building.

What is claimed is:

1. A method for mechanically connecting two optical fibers using an optical fiber connector that includes a mechanical splice designed to connect a first optical fiber having a coating diameter D, the two optical fibers including a second optical fiber having a coating diameter d smaller than the coating diameter D, the method comprising:
    inserting the second optical fiber into a tube thereby obtaining a tubed optical fiber, the tubed optical fiber being one of the two optical fibers;
    fixing the tubed optical fiber in a fiber holder;
    inserting the tubed optical fiber into the mechanical splice and positioning the tubed optical fiber into the fiber groove of the base of the mechanical splice such that distal ends of the two optical fibers including the tubed optical fiber are placed end to end within the mechanical splice; and
    fixing the tubed optical fiber in the mechanical splice in a state in which the distal ends of the two the optical fibers including the tubed optical fiber are positioned end to end and the two optical fibers are pressed with a pressing member of the mechanical splice against the base, with a clamp pressing the base and the pressing member together.

2. The method for mechanically connecting two optical fibers according to claim 1, wherein
    the two optical fibers are the tubed optical fiber and an embedded optical fiber, and
    the inserting of the tubed optical fiber into the mechanical splice includes positioning the tubed optical fiber into the fiber groove of the base of the mechanical splice such that the distal ends of the tubed optical fiber and the embedded optical fiber are placed end to end, the embedded optical fiber being retained in a ferrule fixed to the base.

3. The method for mechanically connecting two optical fibers according to claim 1, wherein
    the fixing of the tubed optical fiber in the fiber holder includes preparing two fiber holders and fixing two tubed optical fibers in the fiber holders, respectively, and
    the inserting of the tubed optical fiber into the mechanical splice includes positioning two tubed optical fibers into a fiber groove of a base of the mechanical splice from both sides of the mechanical splice such that the distal ends of the two tubed optical fibers are placed end to end.

4. The method for mechanically connecting two optical fibers according to claim 1, wherein
    the inserting of the second optical fiber into the tube includes at least one end portion of the tube thereof having a shape such that the diameter thereof increases toward the one end portion.

5. The method for mechanically connecting two optical fibers according to claim 1, wherein
    the inserting of the second optical fiber into the tube includes an end face of the tube being inclined with respect to a plane perpendicular to a central axis of the tube.

6. The method for mechanically connecting two optical fibers according to claim 1, wherein
    the inserting of the second optical fiber into the tube and obtaining the tubed optical fiber includes a distal end of the second optical fiber extending out of the tube.

* * * * *